(12) United States Patent
Subramanian et al.

(10) Patent No.: US 11,650,595 B2
(45) Date of Patent: May 16, 2023

(54) WORKSITE PLAN EXECUTION

(71) Applicant: Caterpillar Inc., Deerfield, IL (US)

(72) Inventors: Gautham Subramanian, Peoria, IL (US); Mark William Whiting, Peru, IL (US)

(73) Assignee: Caterpillar Inc., Peoria, IL (US)

(*) Notice: Subject to any disclaimer, the term of this patent is extended or adjusted under 35 U.S.C. 154(b) by 697 days.

(21) Appl. No.: 16/526,844

(22) Filed: Jul. 30, 2019

(65) Prior Publication Data

US 2021/0034058 A1 Feb. 4, 2021

(51) Int. Cl.
| | | |
|---|---|---|
| G05D 1/02 | (2020.01) | |
| G01S 17/86 | (2020.01) | |
| G01S 13/931 | (2020.01) | |
| G01S 17/89 | (2020.01) | |
| G06T 17/05 | (2011.01) | |

(52) U.S. Cl.
CPC ............ *G05D 1/024* (2013.01); *G01S 13/931* (2013.01); *G01S 17/86* (2020.01); *G01S 17/89* (2013.01); *G06T 17/05* (2013.01); *G01S 2013/9316* (2020.01); *G05D 2201/0207* (2013.01)

(58) Field of Classification Search
CPC ............ G05D 1/024; G05D 2201/0207; G01S 17/86; G01S 13/931; G01S 17/89; G01S 2013/9316; G06T 17/05
See application file for complete search history.

(56) References Cited

U.S. PATENT DOCUMENTS

| | | | |
|---|---|---|---|
| 6,226,572 B1 | 5/2001 | Tojima et al. | |
| 9,244,464 B2* | 1/2016 | Kini | ................ E02F 9/2045 |
| 10,162,318 B2 | 12/2018 | Poss et al. | |
| 11,215,691 B2* | 1/2022 | Hewett | ................ G06Q 20/203 |
| 2007/0050137 A1 | 3/2007 | Woon et al. | |
| 2011/0142099 A1 | 6/2011 | Poncelet Born Morey | |
| 2015/0066782 A1 | 3/2015 | Vainberg et al. | |

(Continued)

FOREIGN PATENT DOCUMENTS

| | | |
|---|---|---|
| CN | 107451726 A | 12/2017 |
| GB | 2555531 A | 5/2018 |
| WO | 2018183571 A1 | 10/2018 |

OTHER PUBLICATIONS

Chinese Patent Office First Office Action for Chinese Patent Appln. No 202080053908.2, dated Jan. 28, 2023 (9 pgs).

*Primary Examiner* — Ig T An
(74) *Attorney, Agent, or Firm* — Lee & Hayes, PLLC (57) ABSTRACT

A method includes receiving a worksite plan to be executed by at least one machine at a worksite from a computing device of a supervising entity, the controller being located at a non-line-of-sight (NLOS) location with respect to the worksite. The worksite plan may include a boundary of the worksite at which the worksite plan is implemented, at least one task defining the worksite plan, and a selection of at least one machine to perform the task. The method may include receiving a validation signal from a device located at the worksite, the validation indicating that the worksite is ready for implementation of the worksite plan based on at least one parameter of worksite readiness. The method may include selecting a first mode of operation of the machine to perform the task and transmitting first instructions to the machine to perform the task based on the first mode of operation.

20 Claims, 4 Drawing Sheets

(56) References Cited

U.S. PATENT DOCUMENTS

| | | | |
|---|---|---|---|
| 2015/0198936 A1* | 7/2015 | McGee | H04W 88/00 |
| | | | 700/40 |
| 2015/0379457 A1 | 12/2015 | Jackson | |
| 2016/0019560 A1 | 1/2016 | Benkert et al. | |
| 2017/0344011 A1* | 11/2017 | Stratton | G05D 1/0276 |
| 2018/0044888 A1 | 2/2018 | Chi et al. | |
| 2018/0218304 A1 | 8/2018 | Shike | |
| 2019/0162551 A1 | 5/2019 | Kean | |
| 2019/0302794 A1* | 10/2019 | Kean | B66C 13/40 |

* cited by examiner

WORKSITE PLAN EXECUTION

TECHNICAL FIELD

The present disclosure relates to a system and method for executing a worksite plan to modify a work surface at a worksite. More specifically, the present disclosure relates to systems and methods of creating a worksite plan and supervising that worksite plan from a non-line-of-sight (NLOS) location. Further, the present disclosure relates to systems and methods of changing and reporting mode operations of machines performing tasks within the worksite plan.

BACKGROUND

Excavation machines, loading machines, hauling machines, grading machines, compacting machines, and other machines are often used to perform a variety of tasks at a worksite. For example, one or more dozers may be used to remove a layer of gravel, concrete, asphalt, soil, or other material making up part of a work surface at the worksite. In some examples, a dozer may form a mound or pile of the removed material at a first location of the work site, and a wheel loader or other loading machine may be configured to move the pile of removed material from the first location to a dump zone, a hauling machine, or any other second location at the worksite. In such examples, the compactor may be controlled (e.g., manually by an operator, remotely by an operator located at a NLOS location with respect to the machine, semi-autonomously, fully-autonomously, etc.) to traverse a travel path defined by the work surface and extending from a current location of the compactor to the location of the work area.

A worksite plan may be created to assist operators and other users in managing, executing, and completing a number of tasks outlined within the worksite plan. In instances where manual operation of machines is performed to execute and complete tasks, efficiency may be diminished due to manual activity and intervention by personnel or other individuals such as supervisors and working crews. The intervention of the personnel may result in mistakes or work performed at a slower rate.

In instances where the machines operate semi-autonomously, fully-autonomously, or via remote control, instructions based on the worksite plan may be sent to the machines, which, in turn, perform a number of maneuvers and operations to complete the tasks as instructed. However, introduction of semi-autonomously-, fully-autonomously-, or remotely-operated machines to a worksite that also includes personnel or other individuals such as supervisors and working crews may create worksite hazards where the personnel may be in danger of coming into contact with a machine or its material moving implements. Further, when operated autonomously or via remote control, the machines may encounter obstacles within the worksite such as ditch, a rut, a pothole, a build-up of material, or other work surface imperfection within the worksite, wildlife, livestock, individuals, and other machines within the worksite, other obstacles that may increase the time for a task to be completed or prohibit the task from being completed altogether. In some examples, the operator of a manually-controlled machine such as a wheel loader may take corrective action to modify such an imperfection or eliminate the obstacle. However, semi-autonomous or fully-autonomous machines may not be configured to perform such maintenance tasks.

Still further, with personnel operating the semi-autonomous or fully-autonomous machines remotely or in an autonomous manner, it may be difficult to identify when a project is nearing completion or any status or percentage of completion of one or more tasks within the worksite plan. This may result in a supervisor or a remote operator not fully understanding what amount of work is left to be performed and may cause the supervisor or the remote operator to misallocate resources to make deadlines for completion of tasks within the worksite plan and/or may make scheduling for the various tasks within the worksite plan difficult.

An example system for task-driven operations of construction machines is described in U.S. Patent Application Publication No. 2015/0379457 (hereinafter referred to as the '457 reference). In particular, the '457 reference describes a system and method for scheduling tasks of a construction project. The task scheduling of the '457 reference includes dividing a plan for a construction project into a plurality of tasks. Each particular task of the plurality of tasks is defined by one or more parameters. The one or more parameters of each particular task are modified based on an operational model defining a sequence of actions for performing the particular task. A construction machine is assigned to each particular task based on the modified one or more parameters of the particular task. Each particular task is dispatched to the construction machine assigned to the particular task for presenting the sequence of actions for performing the particular task. The '457 reference does not, however, describe a non-line-of-sight operation of construction machines or the supervision of a worksite plan, and does not describe methods of clearing obstacles in a semi-autonomous-, fully-autonomous-, or remote-controlled machine environment. Further, the '457 reference does not describe transmission of information associated with how the worksite plan is progressing to other NLOS entities.

Example embodiments of the present disclosure are directed toward overcoming the deficiencies described above.

SUMMARY

In an example embodiment of the present disclosure, a method includes receiving, with a controller, a worksite plan to be executed by at least one machine at a worksite from a computing device of a supervising entity, the controller being located at a NLOS location with respect to the worksite. The worksite plan may include a boundary of the worksite at which the worksite plan is implemented, at least one task including mission parameters defining the worksite plan, a selection of at least one machine to perform the task, and at least one machine parameter. The method may also include receiving, with the controller, a validation signal from a device located at the worksite, the validation indicating that the worksite is ready for implementation of the worksite plan based on at least one parameter of worksite readiness. Further, the method may include selecting, with the controller and based at least in part on the worksite plan, a first mode of operation of the machine to perform the task and transmitting first instructions to the machine to perform the task based on the first mode of operation.

In another example embodiment of the present disclosure, a system includes a communication network configured to transmit signals between a NLOS controller, a NLOS computing device of a supervising entity, and a line-of-sight (LOS) computing device of a validation crew. The NLOS controller and the NLOS computing device are located at a NLOS location with respect to a worksite, and the LOS computing device is located at a LOS location with respect to the worksite. The NLOS computing device is configured to create a worksite plan. The worksite plan includes a boundary of the worksite at which the worksite plan is implemented, at least one task including mission parameters defining the worksite plan, and at least one machine parameter, wherein the NLOS computing device is configured to transmit the worksite plan to the NLOS controller. They system may also include at least one machine communicatively coupled to the NLOS computing device and the NLOS controller via the communication network to implement the task. The machine includes at least one electronic control module (ECM) to control a function of the machine associated with the ECM, and a communication device carried by the machine, in communication with the NLOS controller, and connected to the communication network, the communication device configured to receive first instructions from the NLOS controller defining the task for the machine to implement.

In yet another example embodiment of the present disclosure, a system includes a non-line-of-sight (NLOS) controller being located at a first NLOS location with respect to a worksite, and a machine located at the worksite. The machine includes at least one ECM to control a function of the machine associated with the ECM, and a communication device carried by the machine, in communication with the NLOS controller, the communication device configured to receive first instructions from the NLOS controller defining a task for the machine to implement. The system also includes a communication network configured to transmit signals between the NLOS controller and the communication device carried by the machine. The signals include a worksite plan, and the worksite plan includes the task including mission parameters defining the worksite plan, a boundary of the worksite at which the worksite plan is implemented, and at least one machine parameter. The signals also include a validation request to the communication device carried by the machine requesting a LOS validation crew to validate that the worksite is ready for the worksite plan. The signals also include an operation mode of the machine assigned by the NLOS controller. The operation mode includes at least one of an autonomous operation mode in which the machine is configured to perform at least one function unmanned, a remote-controlled (RC) operation mode in which the machine is configured to operate via remote input from an NLOS computing device of an operator, and a manual operation mode in which the machine is configured to operate via local input by a human.

DETAILED DESCRIPTION

Figure 1:
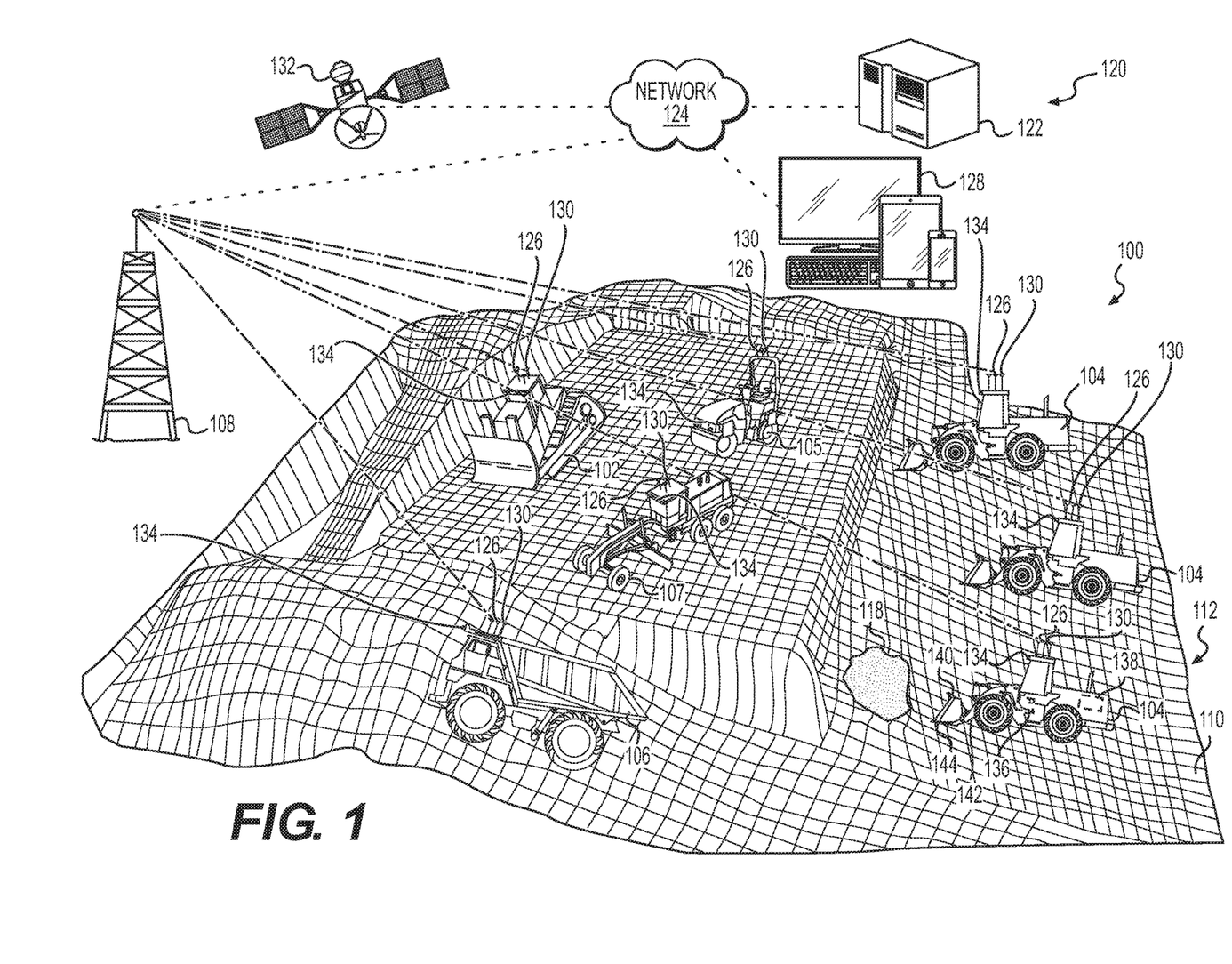
FIG. 1 is a schematic illustration of a system in accordance with an example embodiment of the present disclosure.

Wherever possible, the same reference numbers will be used throughout the drawings to refer to the same or like parts. Referring to FIG. 1, an example system 100 may include one or more machines 102, 104, 105, 106, 107 operating at a worksite 112 to perform various tasks. For example, the system 100 may include one or more digging machines 102, one or more loading machines 104, one or more compacting machines 105, one or more hauling machines 106, one or more grading machines 107, and/or other types of machines used for construction, mining, paving, excavation, and/or other operations at the worksite 112. Each of the machines described herein may be in communication with each other and/or with a local or remote-control system 120 by way of one or more central stations 108. The central station 108 may facilitate wireless communication between the machines described herein and/ or between such machines and, for example, a system controller 122 of the control system 120, for the purpose of transmitting and/or receiving operational data and/or instructions.

A digging machine 102 may refer to any machine that reduces material at the worksite 112 for the purpose of subsequent operations (i.e., for blasting, loading, hauling, and/or other operations). Examples of digging machines 102 may include excavators, backhoes, dozers, drilling machines, trenchers, and drag lines, among other types of digging machines. Multiple digging machines 102 may be co-located within a common area at the worksite 112 and may perform similar functions. For example, one or more of the digging machines may move soil, sand, minerals, gravel, concrete, asphalt, overburden, and/or other material comprising at least part of a work surface 110 of the worksite 112. As such, under normal conditions, similar co-located digging machines 102 may perform about the same with respect to productivity and efficiency when exposed to similar site conditions.

A loading machine 104 may refer to any machine that lifts, carries, loads, and/or removes material that has been reduced by one or more of the digging machines 102. In some examples, a loading machine 104 may remove such material, and may transport the removed material from a first location at the worksite 112 to a second location at the worksite 112 or off or onto the worksite. Examples of a loading machine 104 may include a wheeled or tracked loader, a front shovel, an excavator, a cable shovel, and a stack reclaimer, among other types of loading machines 104. One or more loading machines 104 may operate within common areas of worksite 112 to, for example, load reduced materials onto a hauling machine 106.

A hauling machine 106 may refer to any machine that carries the excavated materials between different locations within worksite 112. Examples of hauling machines 106 may include an articulated truck, an off-highway truck, an on-highway dump truck, and a wheel tractor scraper, among other types of hauling machines 106. Laden hauling machines 106 may carry overburden from areas of excavation within worksite 112, along haul roads to various dump sites, and return to the same or different excavation areas to be loaded again. Under normal conditions, similar co-located hauling machines 106 may perform about the same with respect to productivity and efficiency when exposed to similar site conditions.

A compacting machine 105 may refer to any machine that is configured to apply stress on a work surface 110 of the worksite 112 and cause densification of soil, concrete, asphalt, and/or other materials thereon, and/or to obtain an acceptable surface finish. An operation of the compacting machine 105 may immediately follow operation of a soil grading machine 107 and/or may immediately proceed operation of a soil grading machine 107. In one example, the compacting process may be performed with a compacting machine 105 such as a double drum compacting machines, having a front drum and a back drum, which serve to propel the machine and compact the material to a suitable state via the weight of the compacting machine 105, and may be used in cooperation with drum vibrating apparatuses. Other examples of compacting machines 105 may include a wheeled or tracked compactor, a vibratory compactor, and a tandem vibratory compactor among other types of compacting machines 105. In an example embodiment, the compacting machine 105 may comprise a soil compacting machine 105 configured to compact soil or other materials located on the work surface 110 of the worksite. Although other materials may be compacted using the compacting machine 105, the examples described herein are described in connection with soil compaction. Completing compaction may include multiple passes across the material with the compacting machine.

A grading machine 107 may refer to any machine that is configured to create a substantially flat surface by grading material such as soil at the worksite 112 for subsequent operations, for example, for a compacting operation. Examples of soil grading machines 107 may include scrapers, bulldozers, motor graders or other similar machines commonly known in the art to create a flat surface during operation. Multiple soil grading machines 107 may be co-located within a common area of the worksite 112 and may perform similar functions.

With continued reference to FIG. 1, the system 100 may include a control system 120 and a system controller 122 to control and/or coordinate between various elements within the system 100. In some examples the control system 120 and/or the system controller 122 may be located at a command center (not shown) remote from the worksite 112. In other examples, the system controller 122 and/or one or more components of the control system 120 may be located at the worksite 112. Regardless of the location of the various components of the control system 120, such components may be configured to facilitate communications between, and to provide information to, the digging machines 102, loading machines 104, hauling machines 106, compacting machines 105, grading machines 107, and/or other machines of the system 100. In any of the examples described herein, the functionality of the system controller 122 may be distributed so that certain operations are performed at the worksite 112 and other operations are performed remotely such as, for example, at the remote command center noted above. For example, some operations of the system controller 122 may be performed at the worksite 112, on one or more of the digging machines 102, one or more of the loading machines 104, one or more of the hauling machines 106, one or more of the compacting machines 105, or one or more of the grading machines 107, among other locations and devices of the system 100. It is understood that the system controller 122 may comprise a component of the system 100, a component of one or more of the machines disposed at the worksite 112, a component of a separate mobile device such as, for example, a mobile phone, a tablet, and a laptop computer, among other types of mobile devices, and/or the control system 120.

The system controller 122 may be an electronic controller that operates in a logical fashion to perform operations, execute control algorithms, store and retrieve data, and other desired operations. The system controller 122 may include and/or access memory, secondary storage devices, processors, and any other components for running an application. The memory and secondary storage devices may be in the form of read-only memory (ROM) or random-access memory (RAM) or integrated circuitry that is accessible by the controller. Various other circuits may be associated with the system controller 122 such as power supply circuitry, signal conditioning circuitry, driver circuitry, and other types of circuitry.

The system controller 122 may be a single controller or may include more than one controller. In examples where the system controller 122 includes more than one controller, the system controller 122 may, for example, include additional controllers associated with each of the digging machines 102, loading machines 104, hauling machines 106, compacting machines 105, grading machines 107, and/or other machines of the system 100 configured to control various functions and/or features of the system 100. As used herein, the term "controller" is meant in its broadest sense to include one or more controllers, processors, central processing units, and/or microprocessors that may be associated with the system 100, and that may cooperate in controlling various functions and operations of the machines included in the system 100. The functionality of the system controller 122 may be implemented in hardware and/or software without regard to the functionality. The system controller 122 may rely on one or more data maps, look-up tables, neural networks, algorithms, machine learning algorithms, and/or other components relating to the operating conditions and the operating environment of the system 100 that may be stored in the memory of the system controller 122. Each of the data maps, look-up tables, neural networks, and/or other components noted above may include a collection of data in the form of tables, graphs, and/or equations to maximize the performance and efficiency of the system 100 and its operation.

The components of the control system 120 may be in communication with and/or otherwise operably connected to any of the components of the system 100 via a network 124. The network 124 may be a local area network ("LAN"), a larger network such as a wide area network ("WAN"), or a collection of networks, such as the Internet. Protocols for network communication, such as TCP/IP, may be used to implement the network 124. Although embodiments are described herein as using a network 124 such as the Internet, other distribution techniques may be implemented that transmit information via memory cards, flash memory, or other portable memory devices.

It is also understood that the digging machines 102, loading machines 104, hauling machines 106, compacting machine 105, grading machine 107, and/or other machines of the system 100 may include respective controllers, and each of the respective controllers described herein (including the system controller 122) may be in communication and/or may otherwise be operably connected via the network 124. For example, the network 124 may comprise a component of a wireless communication system of the system 100, and as part of such a wireless communication system, the digging machines 102, loading machines 104, hauling machines 106, compacting machines 105, grading machines 107, and/or other machines of the system 100 may include respective communication devices 126. Such communication devices 126 may be configured to permit wireless transmission of a plurality of signals, instructions, and/or information between the system controller 122 and the respective controllers of the digging machines 102, loading machines 104, hauling machines 106, compacting machines 105, grading machines 107, and/or other machines of the system 100. Such communication devices 126 may also be configured to permit communication with other machines and systems remote from the worksite 112. For example, such communication devices 126 may include a transmitter configured to transmit signals (e.g., via the central station 108 and over the network 124) to a receiver of one or more other such communication devices 126. In such examples, each communication device 126 may also include a receiver configured to receive such signals (e.g., via the central station 108 and over the network 124). In some examples, the transmitter and the receiver of a particular communication device 126 may be combined as a transceiver or other such component. In any of the examples described herein, the respective controllers of the digging machines 102, loading machines 104, hauling machines 106, compacting machine 105, grading machine 107, and/or other machines of the system 100 may be substantially similar to and/or the same as the system controller 122, and may include one or more of the same components thereof.

In any of the examples described herein, the communication devices 126 may also enable communication (e.g., via the central station 108 and over the network 124) with one or more tablets, computers, cellular/wireless telephones, personal digital assistants, mobile devices, or other electronic devices 128 located at the worksite 112 and/or remote from the worksite 112. Such electronic devices 128 may comprise, for example, mobile phones and/or tablets of project managers (e.g., foremen or supervisors) overseeing daily operations at the worksite 112 or at a non-line-of-sight (NLOS) location with respect to the worksite 112. As used herein and in the appended claims, the term "non-line-of-sight (NLOS)" is meant to be understood broadly as any location with respect to the worksite 112 that is obstructed by a physical object such that electromagnetic waves cannot propagate between the location and the worksite 112. In one example, the NLOS location may be a cloud network that provides data storage and computing power sufficient to perform the functions described herein. Conversely, as used herein and in the appended claims, the term "line-of-sight (LOS)" is meant to be understood broadly as any location with respect to the worksite 112 that is not obstructed by a physical object such that electromagnetic waves may propagate between the location and the worksite 112. For example, a NLOS location may be a remote location with respect to the worksite 112 from which an intermediary communication device such as the central station 108 is used to transmit signals between the remote location and the worksite 112 where direct transmission between the remote location and the worksite 112 is not possible. With the inclusion of satellite communications provided via, for example, the GPS satellites 132, a NLOS location may be between several miles and half the circumference of the terrestrial body (e.g., the earth) on which the system 100 is operating with respect to the worksite 112. In this example, a remote operator may semi-autonomously and/or fully-autonomously, remotely operate the machines 102, 104, 105, 106, 107 by sending signals from a computing device such as the system controller 122, an electronic device 128, or another remotely-located computing device to the worksite 112 via the GPS satellites 132, the central station 108, and/or the network 124.

Similarly, as used herein and in the appended claims, the term "remote" is meant to be understood broadly as being located away from the worksite 112. Although a remote location may be within LOS of the worksite 112, remote as used herein refers to a location at which a computing device such as the system controller 122, an electronic device 128, or another remotely-located computing device is not at or on the worksite 112 and uses intermediary communication devices such as the GPS satellites 132, the central station 108, and/or the network 124 to send signals to the worksite 112. Conversely, as used herein and in the appended claims, "local" is meant to be understood broadly as located at or on the worksite 112.

The network 124, communication devices 126, and/or other components of the wireless communication system described herein may implement or utilize any desired system or protocol including any of a plurality of communications standards. The desired protocols will permit communication between the system controller 122, the electronic devices 128, one or more of the communication devices 126, and/or any other desired machines or components of the system 100. Examples of wireless communications systems or protocols that may be used by the system 100 described herein include a wireless personal area network such as Bluetooth®. (e.g., IEEE 802.15), a local area network such as IEEE 802.11b or 802.11g, a cellular network, or any other system or protocol for data transfer. Other wireless communication systems and configurations are contemplated. In some instances, wireless communications may be transmitted and received directly between the control system 120 and a machine (e.g., the digging machines 102, loading machines 104, hauling machines 106, compacting machines 105, grading machines 107, among other machines described herein) of the system 100 or between such machines. In other instances, the communications may be automatically routed without the need for re-transmission by remote personnel.

In example embodiments, one or more machines of the system 100 (e.g., the digging machines 102, loading machines 104, hauling machines 106, compacting machines 105, grading machines 107, among other machines described herein) may include a location sensor 130 configured to determine a location, speed, heading, and/or orientation of the respective machine. In such embodiments, the communication device 126 of the respective machine may be configured to generate and/or transmit signals indicative of such determined locations, speeds, headings, orientations, haul distances, and/or area covered, to, for example, the system controller 122 and/or to the other respective machines of the system 100 as detected by the location sensor 130. In some examples, the location sensors 130 of the respective machines may include and/or comprise a component of global navigation satellite system (GNSS) or a global positioning system (GPS). Alternatively, universal total stations (UTS) may be utilized to locate respective positions of the machines. In example embodiments, one or more of the location sensors 130 described herein may comprise a GPS receiver, transmitter, transceiver, laser prisms, and/or other such device, and the location sensor 130 may be in communication with one or more GPS satellites 132 and/or UTS to determine a respective location of the machine to which the location sensor 130 is connected continuously, substantially continuously, or at various time intervals. One or more additional machines of the system 100 may also be in communication with the one or more GPS satellites 132 and/or UTS, and such GPS satellites 132 and/or UTS may also be configured to determine respective locations of such additional machines. In any of the examples described herein, machine locations, speeds, headings, orientations, and/or other parameters determined by the respective location sensors 130 may be used by the system controller 122 and/or other components of the system 100 to coordinate activities of the digging machines 102, loading machines 104, hauling machines 106, compacting machines 105, grading machines 107, and/or other components of the system 100.

The GPS satellites 132 and/or UTS may be used to receive machine data from the digging machines 102, loading machines 104, hauling machines 106, compacting machines 105, grading machines 107, and/or other machines of the system 100. Further, the GPS satellites 132 and/or UTS may be used to transmit machine data to the system controller 122 or other data processing device or system within the system 100. The machine data may be obtained by a number of sensors 134 coupled to the machines 102, 104, 105 106, 107, processed by the controller 136 of the respective machine 102, 104, 105, 106, 107, and transmitted to other computing devices such as the system controller 122, the electronic devices 128, and/or other data processing devices within the system 100. Although one sensor 134 is depicted in association with each of the machines 102, 104, 105 106, 107, each machine may include a plurality of sensors 134 used to detect a plurality of different environmental parameters associated with the machines 102, 104, 105 106, 107. The sensors 134 may detect any environmental parameter such as, for example, light, motion, temperature, magnetic fields, electrical fields, gravity, velocity, acceleration in any number of directions, humidity, moisture, vibration, pressure, and sound, among other environmental parameters. Thus, the sensors 134 may include accelerometers, thermometers, proximity sensors, electric filed proximity sensors, magnetometer, barometers, seismometer, pressure sensors, and acoustic sensors, among other types of sensors. Corresponding data associated with the type of sensor may be gathered. Thus, data obtained via the sensors may be transmitted to the controller 136 of the respective machine 102, 104, 105, 106, 107 for further transmission and/or processing.

The machine data may be machine telematics data that includes, for example, a location of the machines, utilization data that defines the manner, location, duration, and functions used by the machines, specifications of the machines, the health of the machines, the data obtained from the sensors 134, and other telematics data. Telematics, as used herein, means the complete measuring, transmitting, and receiving of data defining a value of a quantity at a distance, by electrical translating means such as a wired or wireless communication network including the network 124. In one example, the telematics data may include data associated with progress with regard to the level of completion of tasks and the worksite plan by the machines 102, 104, 105, 106, 107 and may be presented as progress indicators sometimes referred to as key progress indicators (KPIs). The worksite plan may include a boundary of the worksite at which the worksite plan is implemented. Further, the worksite plan may include at least one task including mission parameters defining the worksite plan. The mission parameters may include instructions to the machines 102, 104, 105, 106, 107 as to what actions are to be taken to fulfill the tasks such as, for example, a work area at which the task is to be performed, a number of interactive actions the machine is to take with regard to the material 118 such as number of loads to haul, number of passes to make, among other machine-specific mission parameters. The mission parameters may also include a time and/or date by which the task is to be completed or a scheduled time at which actions associated with the task may be performed. The worksite plan may also include at least one machine parameter that defines the dimensions and capabilities of the machines 102, 104, 105, 106, 107. For example, the machine parameters may include sizes of work tool 140 or other material-moving implements of the machines 102, 104, 105, 106, 107, an indication of the manual, autonomous, and remote control capabilities of the machine and whether these capabilities are available for the machines, the type of fuel consumed by the machines 102, 104, 105, 106, 107, the physical dimensions of the machines 102, 104, 105, 106, 107 and other machine parameters that may be useful in determining what tasks of the worksite plan to assign to what machines 102, 104, 105, 106, 107 and what type of operation mode to assign to the machines 102, 104, 105, 106, 107.

With reference again to the progress indicators (PIs), the PIs may be any type of measurement used to evaluate a level or percentage of completion of a project such as the tasks executed by the machines 102, 104, 105, 106, 107 that make up the worksite plan and the worksite plan as a whole. In one example, the telematics data may also include data obtained from the sensors 134. In this example, the telematics data may include data related to the detection of an obstacle within the worksite 112 or along a work surface 110 of the worksite 112. In one example, data related to the detection of an obstacle may be obtained from a sensor 134 such as an imaging device, a light detection and ranging (LIDAR) device, a radar device, and a sonar device among other sensors and technologies used to detect objects in space. The controllers 136 of the respective machines 102, 104, 105, 106, 107 may be used along with the sensors 134 to execute obstacle detection software to identify and/or classify objects included on the image data obtained from the sensors 134. Still further, the telematics data may include data related to the worksite plan. In this example, the telematics data may include data sent from, for example, the system controller 122 of the control system 120, the electronic devices 128, and/or other data processing devices within the system 100. Still further, in one example, the telematics data may also include a unique identifier for each of the machines 102, 104, 105, 106, 107 such as a license plate, a vehicle identification number (VIN), and a media access control (MAC) address associated with the controllers 136 and/or communication devices 126 of the respective machines 102, 104, 105, 106, 107, among other types of unique identifiers. In one example, the unique identifier may be assigned to a machine 102, 104, 105, 106, 107 and stored in memory such as memory associated with the system controller 122 and/or the controller 136 of the respective machine 102, 104, 105, 106, 107.

As described herein, the machines 102, 104, 105, 106, 107 may be operated semi-, or fully-autonomously. As used herein and in the appended claims, the term "autonomous" is meant to be understood broadly as any operation which is either completely automatic or substantially automatic, that is, without significant human involvement in the operation. An autonomous vehicle (e.g., the machines 102, 104, 105, 106, 107) will generally be unmanned, that is without a human pilot or co-pilot. However, an autonomous vehicle may be driven or otherwise operated automatically and have one or more human passengers. Similarly, as used herein and in the appended claims, the term "semi-autonomous" is meant to be understood broadly as any operation which is at least partially automatic and at least partially brought about by human involvement in the operation, that is, with at least some human involvement in the operation. A semi-autonomous vehicle (e.g., the machines 102, 104, 105, 106, 107) may be unmanned without a human pilot or co-pilot or may be manned with a human pilot or co-pilot. In one example, the semi-autonomous vehicle may be manned by at least one individual at the worksite such as at a LOS location or within the machine 102, 104, 105, 106, 107, or manned by an individual remotely operating the machine in a NLOS location.

Thus, as described herein, each of the machines 102, 104, 105, 106, 107 may report production metrics of various types. In one example, the system controller 122, the electronic devices 128, one or more of the communication devices 126, and/or any other desired machines or components of the system 100 may continuously or periodically send requests to the respective communication devices 126 of the machines 102, 104, 105, 106, 107 requesting data obtained from the sensors 134 and/or data associated with the progress indicators be transmitted to the machines or components of the system 100. In another example, the sensors 134 may sense the environment, and that data may be continuously or periodically transmitted to the system controller 122, the electronic devices 128, one or more of the communication devices 126, and/or any other desired machines or components of the system 100 via the communication devices 126 and/or the controllers 136. In one example, the sensors 134 may sense the environment, and that data may be stored in, for example, data storage devices associated with the communication devices 126, the controllers 136, the system controller 122, the electronic devices 128, and/or any other desired machines or components of the system 100.

Thus, as described above, each of the machines 102, 104, 105, 106, 107 may report production metrics in the form of progress indicators (PIs) of different types. Truck loads delivered by the machines 102, 104, 105, 106, 107 and/or a final grade (e.g., via grade control, manual survey, or drone flight) of the worksite 112 may be measured to determine progress of the individual tasks within the worksite plan and the entire worksite plan such as a mass excavation project that utilizes a plurality of different machines 102, 104, 105, 106, 107. The PIs may be used to identify underperforming machines 102, 104, 105, 106, 107 within the worksite plan as well as to allow supervisors, foremen, managers, crew members, and other individuals associated with the worksite plan to know how far along the worksite plan has progressed and how much of the worksite plan may be left to complete. The PIs may be presented on a user interface on, for example, the display devices of the electronic devices 128, a display device associated with the system controller 122, and/or another display device associated the within the system 100. With the display of these production metrics, a user, such as the supervisors, managers, crew members or other individuals associated with the worksite plan, may understand each individual production metric as defined by the PIs as it relates to the tasks and the overall worksite plan. The data sensed by the sensors 134 and transmitted from the machines 102, 104, 105, 106, 107 may be processed by, for example, the system controller 122 using on one or more data maps, look-up tables, neural networks, algorithms, machine learning algorithms, and/or other components to present the data as PIs to the users. In one example, the individual machines 102, 104, 105, 106, 107 may execute their respective tasks within the worksite plan independently. In another example, the machines 102, 104, 105, 106, 107 may operate together to execute and complete the tasks and the worksite plan. In these examples, the PIs may be sent as individual sets of data from individual machines 102, 104, 105, 106, 107, the PIs may be grouped together as groups of machines 102, 104, 105, 106, 107 collect data from their respective sensors, or the PIs (as collect data from respective sensors 134) may be grouped together based on the machines 102, 104, 105, 106, 107 being similar or identical machines 102, 104, 105, 106, 107.

With continued reference to FIG. 1, and as noted above, each of the machines 102, 104, 105, 106, 107, and/or other machines of the system 100 may include a controller 136 as described herein. The controller 136 may comprise a component of a local control system on-board and/or otherwise carried by the respective machine 102, 104, 105, 106, 107. The controllers 136 may be any embedded system within the machines 102, 104, 105, 106, 107 that controls at least one of the electrical systems or subsystems in the machines 102, 104, 105, 106, 107, and thus at least one function of the machines 102, 104, 105, 106, 107. Such controllers 136 may be generally similar or identical to the system controller 122 of the control system 120. For example, each such controller 136 may comprise one or more processors, a memory, and/or other components described herein with respect to the system controller 122. The controllers 136 may include an ECU such as, for example, an electronic control module (ECM), a powertrain control module (PCM), a transmission control module (TCM), a brake control module (EBCM), a central control module (CCM), a central timing module (CTM), a general electronic module (GEM), a body control module (BCM), a suspension control module (SCM), and a control unit, among other types of ECUs. The ECUs may include hardware and embedded software that assist in the operation of the machines 102, 104, 105, 106, 107.

In some examples, a controller 136 may be located on a respective one of the machines 102, 104, 105, 106, 107, and may also include components located remotely from the respective one of the machines 102, 104, 105, 106, 107, such as on any of the other machines of the system 100 or at the command center described herein (not shown). Thus, in some examples the functionality of the controller 136 may be distributed so that certain functions are performed on the respective one of the machines 102, 104, 105, 106, 107 and other functions are performed remotely. In some examples, controller 136 of the local control system carried by a respective machine 102, 104, 105, 106, 107 may enable autonomous and/or semi-autonomous control of the respective machine either alone or in combination with the control system 120. Further, the controller 136 carried by a respective machine 102, 104, 105, 106, 107 may instruct the respective communication devices 126 and location sensors 130 to function as described herein and as directed by, for example, the system controller 122.

In some examples one or more machines 102, 104, 105, 106, 107 of the system 100 may include an implement or other work tool 140 that is coupled to a frame of the machine. For example, in the case of a loading machine 104, the work tool may comprise a bucket configured to carry material within an open volume or other substantially open space thereof. The loading machine 104 may be configured to, for example, scoop, lift, and/or otherwise load material (e.g., material removed by the digging machines 102) into the work tool 140 by lowering the work tool 140 to a loading position. For example, the loading machine 104 may include one or more linkages 142 movably connected to a frame of the loading machine. The work tool 140 may be connected to such linkages 142, and the linkages 142 may be used to lower the work tool 140 (e.g., via one or more hydraulic cylinders, electronic motors, or other devices connected thereto) to a loading position in which a leading edge 144 of the work tool 140 is disposed proximate, adjacent, and/or at the work surface 110, and a base of the work tool 140 is disposed substantially parallel to the work surface 110. The loading machine 104 may then be controlled to advance along the surface of the work surface 110 of the worksite 112 such that the work tool 140 may impact the material, a positive-volume soil 118, and/or other object disposed on the work surface 110 so as to transfer the material at least partially into the open space of the work tool 140. The linkages 142 may then be controlled to raise, pivot, and/or tilt the work tool 140 to a carrying position above the work surface 110. The loading machine 104 may then be controlled to traverse the worksite 112 until the loading machine 104 reaches a dump zone, the hauling machine 106, and/or another location at the worksite 112 designated for receiving the removed material being carried by the work tool 140. The linkages 142 may then be controlled to lower, pivot, and/or tilt the work tool 140 to an unloading position in which the material carried within the open space of the work tool 140 may be deposited (e.g., due to the force of gravity acting on the material carried by the work tool 140) at the dump zone, within a bed of the hauling machine 106, and/or as otherwise desired. Like the loading machines 104, the digging machines 102, hauling machines 106, compacting machines 105, grading machine 107, may also include work tools 140 and/or linkages 142 that allow the machines to perform their respective operations as described herein.

Figure 2:
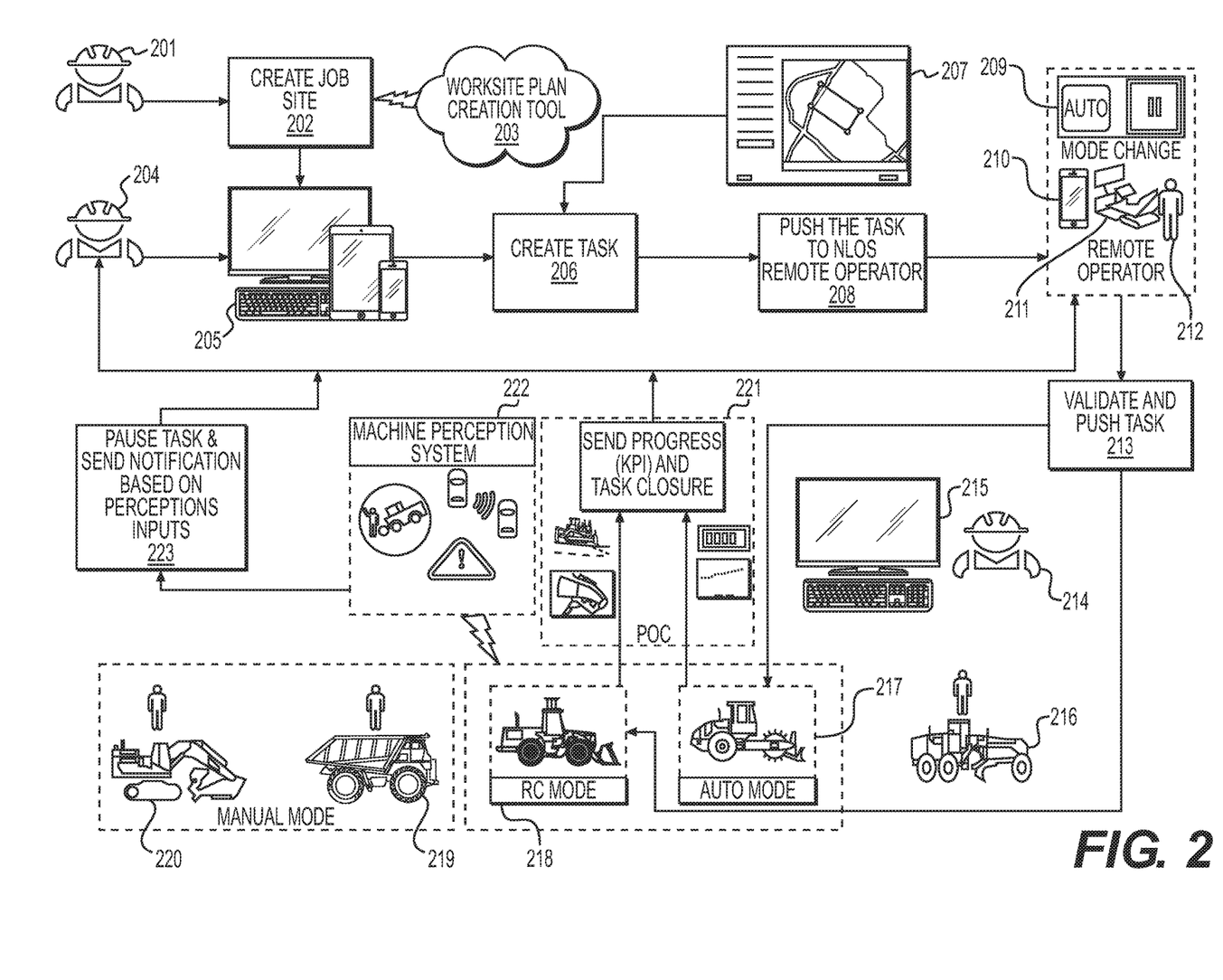
FIG. 2 is a schematic illustration of the system shown in FIG. 1.

FIG. 2 is a schematic illustration of the system 100 shown in FIG. 1. The system controller 122 may execute and provide inputs to the system 100 from a worksite plan creation tool 203 used to create a worksite plan 202. Thus, the system controller 122, in conjunction with other data processing devices described herein, may be used to perform the process described herein in connection with FIG. 2.

As illustrated in FIG. 2, a project manager 201 or other individual may be tasked with creating and/or approving the worksite plan 202. In one example, the worksite plan 202 is created at a NLOS location. The worksite plan 202 may include a boundary of the worksite 112 at which the worksite plan 202 is implemented, at least one task defining the worksite plan 202, and a selection of at least one machine 102, 104, 105, 106, 107 to perform the at least one task. In one example, the individual tasks making up the worksite plan 202 may be identified or defined by a separate computing device as described herein.

The worksite boundary may be used to define the area in which machines 102, 104, 105, 106, 107 may perform the tasks 206. Defining a worksite boundary may assist machines 102, 104, 105, 106, 107 that are operated semi- or fully-autonomously to stay within that worksite boundary as they execute the tasks. The tasks 206 may include any instructions used by human operators and/or the machines 102, 104, 105, 106, 107 operated semi- or fully-autonomously to execute the portion of the worksite plan 202 defined by the tasks 206. In one example, the boundary (e.g., a perimeter) of the worksite 112 may be defined using an address, GPS coordinates, plat maps, or other methods of defining boundaries. In one example, each task 206 within the worksite plan 202 may each be defined by their own respective boundaries to limit a machine 102, 104, 105, 106, 107 utilized to execute the tasks 206 to remain within that defined boundary. In this example, the boundary of the tasks 206 may include an entirety of the boundary of the worksite 112 or a defined portion of the worksite 112 that is less than an entirety of the worksite 112. In one example, the boundaries of the worksite 112 and the tasks 206 may be defined by a user inputting these boundaries, through a user utilizing a drop-down menu and selecting from a number of worksites, through input from a mapping service 207, autonomously given an identification of the property on which the worksite 112 is located, or combinations thereof. In one example, the boundary may include a perimeter of the work surface 110. In this example, the boundary may include a collection of GPS coordinates or other location data indicating the location, extent, and/or other configurations of the boundary. Such location data may be determined using survey data, drone data, and data from machines 102, 104, 105, 106, 107 driving the perimeter of the boundary, among other sources of data defining the boundary.

The machines 102, 104, 105, 106, 107 may be selected based on their ability to perform the tasks 206 within the worksite plan 202. For example, in situations where excavation of a portion of the worksite 112 is included within the worksite plan 202 as a task 206, a digging machine 102 may be selected. Similarly, in situations where compaction of a portion of the work surface 110 of the worksite 112 is included within the worksite plan 202 as a task 206, a compacting machine 105 may be selected. In one example, the machines 102, 104, 105, 106, 107 may be manually or autonomously (e.g., automatically) selected based on the availability of the machines 102, 104, 105, 106, 107 within a schedule of use of the machines 102, 104, 105, 106, 107. Further, in one example, a user may select individual machines 102, 104, 105, 106, 107 and provide such selection as input to, for example, the computing device 205.

The worksite plan 202 may be sent to a computing device 205 of a supervising entity 204. The supervising entity 204 may be any individual tasked with supervising the execution and completion of the worksite plan 202 and any number of tasks included therein. In one example, the computing device 205 of the supervising entity 204 may be located at a NLOS location. The computing device 205 of the supervising entity 204 may divide the worksite plan 202 into a number of individual tasks 206. The tasks 206 may include any number of projects to be executed by a plurality of the machines 102, 104, 105, 106, 107 that make up the overall worksite plan 202. For example, a grading machine 107 may be associated with a task 206 to grade an area of the worksite 112, and a compacting machine 105 may be associated with a task 206 to compact an area of the worksite 112. Each machine 102, 104, 105, 106, 107 selected by the worksite plan creation tool 203 may be included within the worksite plan 202 as having at least one task 206 to perform, and that task may be identified and scheduled by the computing device 205 of the supervising entity 204. In one example, the boundary of the worksite 112 at which the worksite plan is implemented and a selection of at least one machine 102, 104, 105, 106, 107 to perform the at least one task may be provided as input 207 as the computing device 205 of the supervising entity 204 creates the tasks. In this example, the worksite plan 202 may be pushed to the computing device 205 of the supervising entity 204, and, as part of the identification and scheduling of the tasks 206 by the computing device 205 of the supervising entity 204, the worksite boundaries and machine 102, 104, 105, 106, 107 selection may be input by, for example, the supervising entity 204 as part of the task 206 creation.

The worksite plan 202 and the tasks 206 are transmitted or pushed 208 to a remote operator 212. The worksite plan 202 and the tasks 206 may include data files that are generated at the system controller 122 and that may be transmitted via the network 124. In one example, a summary of the worksite plan 202 and the tasks 206 may be presented to, for example, the computing device 205 of the supervising entity 204 for review by the supervising entity 204 before being pushed 208 to a remote operator 212.

A remote operator 212 may be any individual located at a NLOS location with respect to the worksite 112. The remote operator 212 may remotely operate a number of machines 102, 104, 105, 106, 107 located at the worksite 112, and has access to the worksite plan 202 and the individual tasks 206 created by the computing device 205 of the supervising entity 204. With this information, the remote operator 212 may operate any of the machines 102, 104, 105, 106, 107 using a remote computing device 211. The remote computing device 211 may be communicatively coupled to the machines 102, 104, 105, 106, 107 at the worksite 112 via, for example, the network 124, the satellite 132, the central station 108, the electronic devices 128, and other devices communicating with the communication devices 126 and controllers 136 of the respective machines 102, 104, 105, 106, 107. Instructions input by the remote operator 212 at the remote computing device 211 may be sent as instructions to the communication devices 126 and controllers 136 of the respective machines 102, 104, 105, 106, 107 to cause the machines 102, 104, 105, 106, 107 to function based on the remote operator's inputs. In this manner, the remote operator 212 may remotely control the machines 102, 104, 105, 106, 107 using the remote-control operation mode.

In one example, the remote operator 212 may also have an electronic device 210 like the electronic devices 128 described herein in connection with FIG. 1. The worksite plan 202 and the tasks 206 may be sent to the electronic device 210 of the remote operator 212 to inform the remote operator of the information included within the worksite plan 202 and the tasks 206. Specifically, the worksite plan 202 may include details regarding which machine 102, 104, 105, 106, 107 is to perform which tasks 206, and the mode of operation of the machines 102, 104, 105, 106, 107 used during the execution of the tasks 206.

The mode of operations may include a RC operation mode as exemplified at element 218 where the machines 102, 104, 105, 106, 107 are controlled from the NLOS location of the remote computing device 211 as the remote operator 212 provides input to the remote computing device 211. In this manner, the remote operator 212 may operate the machines 102, 104, 105, 106, 107 from a NLOS location. The worksite plan 202 as transmitted to the electronic device 210 and/or the remote computing device 211 of the remote operator 212 may include an identification of which machines 102, 104, 105, 106, 107 are to be remotely operated to execute tasks 206 within the worksite plan 202. The remote operator 212 may use this transmitted information in order to remotely operate the machines 102, 104, 105, 106, 107 under the RC operation mode 218.

The mode of operations may also include a semi-autonomous or fully-autonomous mode of operation as exemplified at element 217. The worksite plan 202 as transmitted to the electronic device 210, remote computing device 211, the computing device 205 of the supervising entity 204, the machines 102, 104, 105, 106, 107, and/or other computing devices may include an identification of which machines 102, 104, 105, 106, 107 are to be semi-autonomously or fully-autonomously operated to execute tasks 206 within the worksite plan 202. In this example, the remote operator 212, the supervising entity 204, or other individual may send instructions to those machines 102, 104, 105, 106, 107. Specifically, the instructions in this example may be sent to the controllers 136 of the respective machine 102, 104, 105, 106, 107 via the network 124 and other devices coupled to the network 124 to, when executed by the controllers 136 of the respective machine 102, 104, 105, 106, 107, control at least one function of the of the machines 102, 104, 105, 106, 107 in order to perform the tasks. Those machines 102, 104, 105, 106, 107 may begin to operate in a semi-autonomously or fully-autonomously manner. In one example, the machines 102, 104, 105, 106, 107 operated semi-autonomously or fully-autonomously may be sent instructions from a NLOS location such as, for example, the electronic device 210, remote computing device 211, the computing device 205 of the supervising entity 204, and/or other computing devices.

The mode of operations may also include a manual mode of operation. A manual mode of operation includes a human, LOS-located operator 214 (i.e., located at the worksite 112) operating the machines 102, 104, 105, 106, 107. In this example, the LOS-located operator 214 may receive instructions from the remote computing device 211 of the remote operator 212, the computing device 205 of the supervising entity 204, or other computing devices at a local computing device 215 that includes an identification of which machines 102, 104, 105, 106, 107 are to be manually operated by the LOS-located operator 214 to execute tasks 206 within the worksite plan 202. In one example, the local computing device 215 may be an electronic device carried or used by the LOS-located operator 214 such that the LOS-located operator 214 may receive the instructions associated with the worksite plan 202 and the tasks 206 and utilize one or more machines 102, 104, 105, 106, 107 to execute and complete the tasks 206.

With the data representing the worksite plan 202 and tasks 206 having been sent to the computing device 205 of the supervising entity 204, the remote computing device 211 of the remote operator 212, the local computing device 215 of the LOS-located operator 214, and/or the machines 102, 104, 105, 106, 107, the supervising entity 204 and the remote operator 212 may oversee the execution of the worksite plan 202 and the individual tasks 206. In one example, the remote operator 212, via the remote computing device 211, may validate 213 that the worksite 112 is ready for the worksite plan 202 to be executed in order to push the tasks 206 to the worksite 112. Validation 213 of the worksite 112 may include communicating between the remote computing device 211 of the remote operator 212 and the local computing device 215 of the LOS-located operator 214 regarding the state of the worksite 112 and whether the worksite is ready to receive autonomous, RC and/or manual mode operations of the machines 102, 104, 105, 106, 107 at the worksite 112. In one example, the worksite 112 may be ready for execution of the worksite plan 202 and the tasks 206 if the worksite 112 is clear of obstacles or hazards within the worksite 112 such as personnel or worksite crew, bystanders, other machines 102, 104, 105, 106, 107, and other individuals and objects that may be in harm's way should the worksite plan 202 be executed without first clearing the worksite 112. The LOS-located operator 214, using the local computing device 215, may communicate with the remote operator 212 using the remote computing device 211 to indicate the state of the worksite 112 and confirm or validate 213 whether the worksite 112 is ready for execution of the worksite plan 202. If the LOS-located operator 214 indicates that the worksite 112 is not ready for the execution of the worksite plan 202, then the parties may wait until the worksite 112 is properly prepared and made ready and validation 213 of such is received from the LOS-located operator 214.

If, however, the LOS-located operator 214 validates 213 that the worksite 112 is ready for the execution of the worksite plan 202, then the tasks 206 for the individual machines 102, 104, 105, 106, 107 may be pushed 213 to the worksite 112. Pushing 213 the tasks 206 to the worksite 112 may include sending instructions (i.e., electronic files passed between the remote computing device 211 or another computing device described herein and the local computing device 215 via the network 124) to one or more LOS-located operators 214 to manually operate at least one of the machines 102, 104, 105, 106, 107 in order to complete the tasks 206. In the example of FIG. 2, the machines 102, 104, 105, 106, 107 that are to be manually operated are designated as elements 216, 219 and 220 (i.e., manually operated machines) with their respective operators. Instructions to the LOS-located operators 214 may be received by the LOS-located operators 214 via the local computing device 215. In one example, the local computing device 215 may be a personal computing device such as a tablet, mobile phone, smartphone or other electronic device 128 used by individual LOS-located operators 214 to receive such instructions. In this example, the LOS-located operators 214 may conveniently receive instructions defining the at least one task 206 of the worksite plan 202 and begin manual operation of the machines 102, 104, 105, 106, 107 at the worksite 112.

Further, pushing 213 the tasks 206 to the worksite 112 may include sending instructions to at least one of the machines 102, 104, 105, 106, 107 to semi- or fully-autonomously operate to complete the tasks 206. Validation 213 of the readiness of the worksite 112 by the remote operator 212 and the LOS-located operators 214 ensures that the semi- or fully-autonomously operation of the machines 102, 104, 105, 106, 107 will not present a hazard to life or property at the worksite 112. The pushing 213 of the instructions to the machines 102, 104, 105, 106, 107 to operate semi- or fully-autonomously may be achieved by the remote operator 212, using the remote computing device 211 or another computing device described herein, sending instructions to the communication devices 126 and controllers 136 of the respective machines 102, 104, 105, 106, 107 via the network 124, and, more specifically, via the system controller 122, the satellite 132, the central station 108, and other communications devices described herein. The instructions may be provided in a language and/or format understandable by the communication devices 126 and controllers 136 of the respective machines 102, 104, 105, 106, 107 in order to allow the machines 102, 104, 105, 106, 107 to operate in a semi- or fully-autonomous manner.

Still further, pushing 213 the tasks 206 to the worksite 112 may include sending instructions to at least one of the machines 102, 104, 105, 106, 107 via RC operation of the machines 102, 104, 105, 106, 107 by the remote operator 212. In this example, the remote operator 212 may receive instructions to remotely operate at least one of the machines 102, 104, 105, 106, 107 in order to complete the tasks 206. Instructions to the remote operator 212 may be sent to the remote operator 212 via the remote computing device 211 from, for example, the computing device 205. In one example, the remote computing device 211 may be a personal computing device such as a tablet, mobile phone, smartphone or other electronic device 128 used by the remote operator 212 to receive such instructions. In this example, the remote operator 212 may conveniently receive instructions defining the at least one task 206 of the worksite plan 202 and begin remote operation of the machines 102, 104, 105, 106, 107 at the worksite 112. In one example, the portion of the worksite plan 202 including any tasks 206 that are to be performed using the remote computing device 211 may be sent to the remote operator 212 as the tasks 206 are pushed to the NLOS, remote operator 212 in the first instance at 208. The pushing 213 of the instructions to the machines 102, 104, 105, 106, 107 to operate remotely may be achieved by the remote operator 212, using the remote computing device 211, inputting instructions to the remote computing device 211 and, in real time, sending those instructions to the communication devices 126 and controllers 136 of the respective machines 102, 104, 105, 106, 107 via the network 124, and, more specifically, via the system controller 122, the satellite 132, the central station 108, and other communications devices described herein. In this manner, the remote operator 212 may control at least one function of the machines 102, 104, 105, 106, 107 via the remote computing device 211.

The remote operator 212 may designate which of the machines 102, 104, 105, 106, 107 are to be operated via a manual operation mode as designated by elements 216, 219, 220, a semi- or fully-autonomously operation mode as designated by element 216, or an RC operation mode as designated by element 218 using an operation mode user interface (UI) 209. As described herein, the operation mode UI 209 may be used to change the operation mode of one or more of the machines 102, 104, 105, 106, 107 as a result of one or more inputs to the system such as, for example, the identification of an obstacle by a machine perception system 222. In one example, the operation mode UI 209 may be presented on the remote computing device 211, the electronic device 210 of the remote operator 212, or combinations thereof. In this manner, the remote operator 212 may change the operation mode of at least one machine 102, 104, 105, 106, 107 either as an optional selection or as a result of receiving a triggering event notification such as the identification of an obstacle. For example, the operation mode UI 209 may be used to switch the operation mode of a manually-operated machine to an RC-operated or autonomously-operated machine. In this example, a LOS-located operator 214 may be instructed to get out of the machine 102, 104, 105, 106, 107 being manually operated and allow for RC or autonomous operation of the machine 102, 104, 105, 106, 107.

Similarly, in another example, the operation mode UI 209 may be used to switch the operation mode of an autonomously-operated machine to a manually- or RC-operated machine. In this example, the autonomously-operated machine may encounter an obstacle, and the remote operator 212 or a LOS-located operator 214 may be tasked with RC or manually operating the machine 102, 104, 105, 106, 107 in order to circumvent or remove the obstacle where an autonomous operation of the machine 102, 104, 105, 106, 107 may not be able to circumvent or remove the obstacle.

Further, in another example, the operation mode UI 209 may be used to switch the operation mode of a RC-operated machine to a manually- or autonomously-operated machine. In this example, the remote operator 212 may not be able to remotely operate the machine 102, 104, 105, 106, 107, and may switch the operation mode to manual operation or autonomous operation in order to ensure that the task 206 originally assigned to the remote operator 212 may be completed.

As mentioned herein, each machine 102, 104, 105, 106, 107 may include a machine perception system 222. In association with the description of the sensors 134 provided above, the machine perception system 222 may include a number of perception sensors 134 as a type of sensor coupled to each of the machines 102, 104, 105, 106, 107, 216, 217, 218, 219, 220. The perception sensors 134 and/or the local perception system carried by the each of the machines 102, 104, 105, 106, 107, 216, 217, 218, 219, 220 may include a light detection and ranging (hereinafter, "LIDAR") sensor. Such a LIDAR sensor may include one or more lasers or other light emitters carried by (e.g., mounted on, connected to, etc.) the particular machine 102, 104, 105, 106, 107, 216, 217, 218, 219, 220, as well as one or more light sensors configured to receive radiation radiated, reflected, and/or otherwise returned by an object onto which light from such light emitters has been impinged. In example embodiments, such a LIDAR sensor may be configured such that the one or more lasers or other light emitters are mounted to spin (e.g., about a substantially vertical axis), thereby causing the light emitters to sweep through, for example, a 360 degree range of motion, to capture LIDAR sensor data associated with an obstacle, the work surface 110, and/or the worksite 112, generally. For example, a LIDAR sensor of the present disclosure may have a light emitter and a light sensor, with the light emitter including one or more lasers that direct highly focused light toward an object or surface, which reflects the light back to the light sensor, though any other light emission and detection to determine range is contemplated (e.g., flash LIDAR, MEMS LIDAR, solid state LIDAR, and the like). Measurements of such a LIDAR sensor may be represented as three-dimensional LIDAR sensor data having coordinates (e.g., Cartesian, polar, etc.) corresponding to positions or distances captured by the LIDAR sensor. For example, three-dimensional LIDAR sensor data and/or other sensor information received from the LIDAR sensor may include a three-dimensional map or point cloud, which may be represented as a plurality of vectors emanating from a light emitter and terminating at an object (e.g., an imperfection 118) or surface (e.g., the work surface 110). In some examples, converting operations may be used by the controller 136, the local computing device 215, the remote computing device 211 of the remote operator 212, the computing device 205 of the supervising entity 204, and/or by the system controller 122 to convert the three-dimensional LIDAR sensor data to multi-channel two-dimensional data. In some examples, the LIDAR sensor data and/or other sensor information received from the perception sensor 134 may be automatically segmented by the controller 136, the local computing device 215, the remote computing device 211 of the remote operator 212, the computing device 205 of the supervising entity 204, and/or by the system controller 122, and the segmented LIDAR sensor data may be used, for example, as input for determining whether an obstacle exists and whether the operation mode should be adjusted by the remote operator 212 via the operation mode UI 209.

The perception sensor 134 and/or the local perception system carried by the machine may also include one or more additional sensors. Such additional sensors may include, for example, a radio detection and ranging (hereinafter, "RADAR") sensor, a sound navigation and ranging (hereinafter, "SONAR") sensor, a depth sensing camera, a ground-penetrating RADAR sensor, a magnetic field emitter/detector, and/or other sensors disposed on the vehicle and configured to detect objects present in the worksite 112. Each of the sensors described herein with respect to the perception sensor 134 and/or the local perception system may output one or more respective signals to the controller 136, the local computing device 215, the remote computing device 211 of the remote operator 212, the computing device 205 of the supervising entity 204, and/or by the system controller 122, and such signals may include any of the sensor information described above (e.g., image data, LIDAR data, RADAR data, SONAR data, GPS data, etc.). Such sensor information may be captured simultaneously by the various sensors of the perception sensor 134, and in some instances, the sensor information received from the respective sensors of the perception sensor 134 may include, identify, and/or be indicative of one or more of the same objects sensed by such sensors. In such examples, the controller 136, the local computing device 215, the remote computing device 211 of the remote operator 212, the computing device 205 of the supervising entity 204, and/or by the system controller 122 may analyze the sensor information received from each of the respective sensors to identify and/or classify the one or more objects indicated by the sensor information.

For example, the controller 136, the local computing device 215, the remote computing device 211 of the remote operator 212, the computing device 205 of the supervising entity 204, and/or by the system controller 122 may correlate the output of each sensor modality to a particular object stored in a memory thereof and/or to a particular location of the worksite 112. Using such data association, object recognition, and/or object characterization techniques, the output of each of the sensors described herein can be compared. Through such comparisons, and based at least partly on the sensor information received from the perception sensor 134 and/or the location sensor 130, the controller 136, the local computing device 215, the remote computing device 211 of the remote operator 212, the computing device 205 of the supervising entity 204, and/or by the system controller 122 may identify one or more objects located at the worksite 112 (e.g., an obstacle along the work surface 110). As noted above, corresponding sensor information received from both the perception sensor 134 and the location sensor 130 may be combined and/or considered together by the controller 136, the local computing device 215, the remote computing device 211 of the remote operator 212, the computing device 205 of the supervising entity 204, and/or by the system controller 122 in order to determine the location, shape, dimensions, volume, and/or other characteristics of the obstacles described herein.

Further, in some examples, and depending on the accuracy and/or fidelity of the sensor information received from the various sensors associated with the perception sensor 134, the presence, location, orientation, identity, length, width, height, depth, and/or other characteristics of an object (e.g., the obstacle) identified by the controller 136 using first sensor information (e.g., LIDAR data) may be verified by the controller 136 using second sensor information (e.g., image data) obtained simultaneously with the first sensor information but from a different sensor or modality of the perception sensor 134.

In one example, manually-, RC-, and autonomously-operated machines 102, 104, 105, 106, 107, 216, 217, 218, 219, 220 (hereinafter referred to as 102-220) may each utilize their respective perception sensors 134 and the machine perception system 222 to identify and report the presence of an obstacle along the work surface 110 of the worksite 112. The obstacles may present a danger to life, health of individuals at the worksite 112, and/or property. For this reason, any tasks 20 being executed via RC- or autonomously-operated machines 102-220 such as machines 217 and 218 may be paused 223, and the obstacle may be avoided. The existence of the obstacle may be reported 223 by the machine perception system 222 to the remote operator 212 (e.g., via the electronic device 210 and/or the remote computing device 211) and/or the supervising entity 204 (e.g., via the computing device 205) to inform the remote operator 212 and/or the supervising entity 204 of the obstacle and the pausing of the task 206. Reporting the pausing of the task 206 and the existence of the obstacle may be provided by sending a notification to the electronic device 210, the remote computing device 211, and/or the computing device 205.

In response to receiving a notification 223 from the machine perception system 222, the remote operator 212 may change an operation mode of the machines 102-220. For example, for at least one machine 102-220 being operated via RC or autonomously, the remote operator 212 may change the mode of operation of the machine 102-220 to a manual mode of operation via the operation mode UI 209. In this example, a LOS-located operator 214 may gain access to the machine 102-220 and operate the machine 102-220 to complete the task 206, clear the obstacle, or combinations thereof. In one example, manual labor without the use of a machine 102-220 may be used to clear the obstacle. For example, the obstacle may be bystanders who have accessed the worksite 112. In this example, the LOS-located operator 214 may request the bystanders to leave the worksite. In another example, the obstacle may be a work surface imperfection such as a ditch that may make it impossible for the machine 102-220 to traverse or otherwise execute the task at that location within the worksite 112. In this example, the LOS-located operator 214 may access any one of the machines 102-220 that may be used to smooth or fill in the ditch with material 118 and operate that machine 102-220 manually to correct the work surface imperfection.

In one example, the operation mode may be changed any number of times including before and after the obstacle has been cleared. In this example, the remote operator 212 may receive notifications regarding the existence of the obstacle, the pausing of the task 206 being performed by the machines 102-220, and the clearing of the obstacle. A notification of the clearing of the obstacle may include processes similar to that described herein in connection with block 213 where the worksite 112 is validated 213 as being ready for the worksite plan 202 to be executed. In this example, the LOS-located operator 214 may confirm for the remote operator 212 that the obstacle has been cleared and operations at the worksite 112 may resume including the execution of the tasks 206 paused at block 223.

The system 100 may also report progress achieved in executing the worksite plan 202 and the individual tasks 206 included in the worksite plan 202. At block 220, a number of PIs may be collected by the controllers 136 of the respective machines 102-220 as the machines 102-220 execute their respective tasks 206. The PIs may include a number of metrics of the machines 102-220 such as, for example, linear progress of the machines 102-220, a number of passes of the machines 102-220 over the work surface 110 of the worksite 112, mass or volume of material 118 moved, loads of material 118 moved, distance from a goal work surface 110 height, grade of the works surface 110, hours of operation of the machines 102-220, and an estimated time to completion of a task 206 and/or the worksite plan 202, among other PIs that indicate a percentage of progress with respect to the tasks 206. In one example, the PIs of different machines may be different due to the functionality and purpose of the different machines 102-220 performing tasks within the worksite 112. In one example, the system 100 may utilize a map or three-dimensional (3D) integration as a means to identify a number of PIs. In this example, a UI may track the position of the machines 102-220 based on data obtained from the location sensors 130. Tracking of the positions of the machines 102-220 may provide 3D terrain progress information that may translate into measurable PIs.

The PIs may be reported to the electronic device 210, the remote computing device 211, and/or the computing device 205 using the network 124, the central station 108, the satellite 132, or combinations thereof. In one example, the PIs may be transmitted as telematics data as described herein. The data transmitted from the machines 102-220 may be processed by, for example, the electronic device 210, the remote computing device 211, and/or the computing device 205 using on one or more data maps, look-up tables, neural networks, algorithms, machine learning algorithms, and/or other components to obtain a data set that indicates a level or percentage of completion of the individual tasks 206 and the worksite plan 202 as a whole. In addition to the PIs being reported at block 221, data representing the position, heading, speed, and mode of operation, among other data associated with the operation or functioning of the machines 102-220 may be reported.

Still further, in one example, the completion of a task 206 by one or more of the machines 120-220 may also be reported to the electronic device 210, the remote computing device 211, and/or the computing device 205 as telematic data. In examples where a machine 120-220 is operated using a manual mode by an LOS-located operator 214, the LOS-located operator 214 may enter data into, for example, the local computing device 215 indicating completion of a task 206 by the LOS-located operator 214 operating the machine 102-220. In an example where the machine 102-220 is being operated remotely (i.e., RC operation mode) by a remote operator 212, the remote operator 212 may enter data into, for example, the electronic device 210 and/or the remote computing device 211 indicating completion of a task 206 by the remote operator 212 RC operating the machine 102-220. In an example where the machine 102-220 is being autonomously operated (i.e., autonomous operation mode), the machine 102-220 may report the completion of the task 206 in the same manner as the PIs are reported to the electronic device 210, the remote computing device 211, and/or the computing device 205 using the network 124.

In still another example, the status of at least one of the machines 120-220 may be reported to the electronic device 210, the remote computing device 211, and/or the computing device 205 for review by the supervising entity 204 and the remote operator 212. The status of the machines 120-220 may include, for example, whether the machine 120-220 is non-functional in any manner, an amount of fuel remaining in the machine 120-220, air pressure within tires of the machine 120-220, and other aspects of how the machine 120-220 is functioning. This may allow the supervising entity 204 and the remote operator 212 to remove and/or replace a machine 120-200 within the worksite 112 for maintenance and to increase efficiency within the worksite plan 202.

Reporting the PIs and completed tasks 206 within the worksite plan 202 to the electronic device 210, the remote computing device 211, and/or the computing device 205 allows users of these devices to quickly determine the progress of the worksite plan 202. In one example, the data representing PIs and completed tasks 206 may be presented on a display device of the electronic device 210, the remote computing device 211, and/or the computing device 205 in a UI that presents representations of the PIs and completed tasks 206 in a user-understandable format. Once the supervising entity 204 and the remote operator 212 have access to the PIs and indications of completed tasks 206, the supervising entity 204 and the remote operator 212 may make changes to the worksite plan 202, the tasks 206, the modes of operation of the machines 102-220, and other parameters of the work performed at the worksite 112 in order to execute the worksite plan 202 in a more efficient and/or safer manner.

Figure 3:
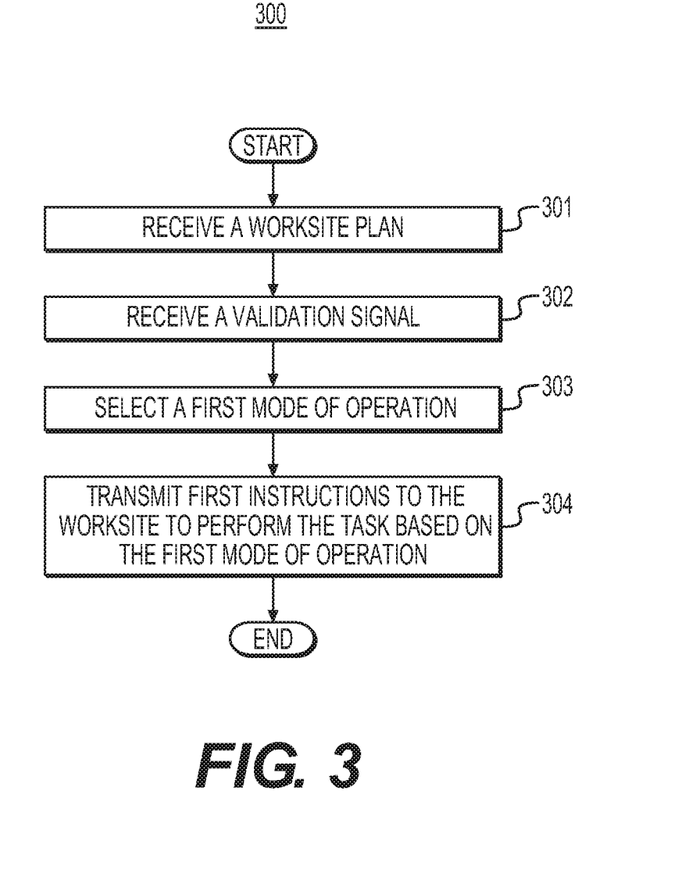
FIG. 3 is a flow chart depicting an example method associated with the system shown in FIGS. 1 and 2.

FIG. 3 is a flow chart depicting an example method 300 associated with the system shown in FIGS. 1 and 2. The method 300 may include receiving 302, with a controller such as the controller or processors of the electronic device 210 and/or the remote computing device 211, a worksite plan 202 to be executed by at least one machine 120-220 at a worksite 112 from a computing device 205 of a supervising entity 204. The controller may be located at a NLOS location with respect to the worksite 112. The worksite plan 202 may include a boundary of the worksite at which the worksite plan 202 is implemented, at least one task 206 defining the worksite plan 202, and a selection of at least one machine 102-220 to perform the task 206.

The controller of the electronic device 210 and/or the remote computing device 211 may also receive 304 a validation signal from a device such as the local computing device 215 of the LOS-located operator 214 located at the worksite 112. The validation 213 may indicate that the worksite 112 is ready for implementation of the worksite plan 202 based on at least one parameter of worksite readiness. As described herein, the worksite 112 may be ready for working if and when the worksite 112 is clear of obstacles or hazards such as personnel or worksite crew, bystanders, other machines 102, 104, 105, 106, 107, and other individuals and objects that may be in harm's way should the worksite plan 202 be executed without first clearing the worksite 112.

The method 300 may also include selecting 306, with the controller of the electronic device 210 and/or the remote computing device 211 and based at least in part on the worksite plan 202, a first mode of operation of the machine 120-220 to perform the task. As described herein, the modes of operation including the manual operation mode 220, the RC operation mode 217, and the autonomous operation mode 216 may be selected based on the characteristics and/or capabilities of the machines 120-220, the availability of the machines 120-220, and the presence of a remote operator 212, among other parameters. In one example, the remote operator 212 may select the mode of operation of the machines 120-220. In another example, the mode of operation of the machines 120-220 may be selected autonomously by the worksite plan creation tool 203, the computing device 205, and/or the remote computing device 211.

The remote computing device 211 may transmit 308 first instructions to perform the task 206 of the worksite plan 202 to the worksite 112. In one example, the first instructions may be transmitted based on the first mode of operation selected 306. In this example, the instructions may be transmitted 308 to the local computing device 215 of the LOS-located operator 214 in instances where the first mode of operation is a manual mode of operation. Further, in this example, the instructions may be transmitted 308 to at least one of the machines 120-220, and, specifically, the communication device 126 and controller 136 of the machine 120-220 in instances where the first mode of operation is an autonomous mode of operation. Still further, in this example, the instructions may be transmitted 308 to the electronic device 210 and/or the remote computing device 211 of the remote operator 212 in instances where the first mode of operation is a RC mode of operation.

Figure 4:
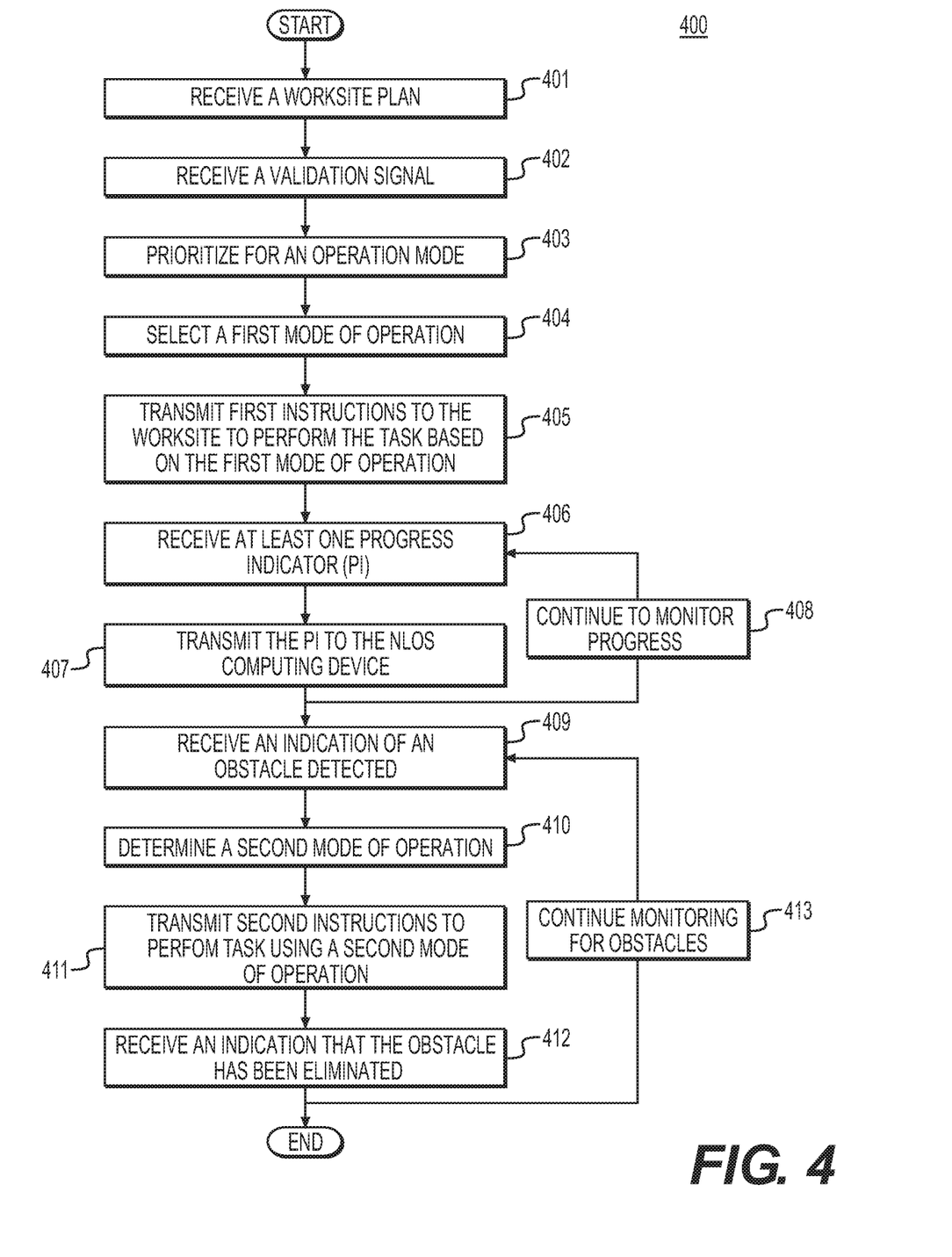
FIG. 4 is a flow chart depicting an example method associated with the system shown in FIGS. 1 and 2.

FIG. 4 is a flow chart depicting an example method associated with the system shown in FIGS. 1 and 2. The method 400 may include receiving 402, with a controller such as the controller or processors of the electronic device 210 and/or the remote computing device 211, a worksite plan 202 to be executed by at least one machine 120-220 at a worksite 112 from a computing device 205 of a supervising entity 204. The controller of the electronic device 210 and/or the remote computing device 211 may also receive 404 a validation signal from a device such as the local computing device 215 of the LOS-located operator 214 located at the worksite 112 to indicate that the worksite 112 is ready for implementation of the worksite plan 202 based on at least one parameter of worksite readiness.

At 406, the system controller 122 may prioritize for one of the autonomous operation mode, the RC operation mode, and the manual operation mode based at least on a capability of the machine 120-220. As described herein, the machines 120-220 operate under at least one of an autonomous operation mode in which the machine is configured to perform at least one function unmanned, an RC operation mode in which the machine 120-220 is configured to operate via remote input from an NLOS computing device 211 of the remote operator 212, and a manual operation mode in which the machine 120-220 is configured to operate via local input by a human such as the LOS-located operator 214. Prioritization 406 of the operation mode may be based on the characteristics and/or capabilities of the machines 120-220, the availability of the machines 120-220, and the presence of a remote operator 212, among other parameters. In one example, the remote operator 212 may select the mode of operation of the machines 120-220. In another example, the mode of operation of the machines 120-220 may be selected autonomously by the worksite plan creation tool 203, the computing device 205, and/or the remote computing device 211.

The method 400 may also include selecting 408, with the controller of the electronic device 210 and/or the remote computing device 211 and based at least in part on the worksite plan 202, a first mode of operation of the machine 120-220 to perform the task. First instructions may also be transmitted 410 to the worksite 112 to perform the task 206 based on the first mode of operation selected at 408.

As described herein, at least in PI may be received 412 by the electronic device 210, the remote computing device 211, and/or the computing device 205 using the network 124, the central station 108, the satellite 132, or combinations thereof. The PI indicates a percentage of completion of the task and/or the overall worksite plan 202. In one example, the PI may be transmitted 414 to a NLOS computing device for processing and presentation to a user such as the supervising entity 204 or the remote operator 212. The system controller 122 or other processing device may continue to monitor 416 progress of the worksite plan 202 and the tasks 206 included therein by looping back to 412.

At 418, the system controller 122 may receive, by the controller such as the controller or processors of the electronic device 210 and/or the remote computing device 211, an indication that an obstacle related to an operation of the machine 120-220 has been detected, and determining 420, with the controller and based at least partly on the worksite plan 202, a second mode of operation of the machine 120-220 to complete the task 206. In this manner, the task 406 may be completed in a safe and effective manner.

At 422, the system controller 122 may transmit second instructions to the machine 120-220 at the worksite 112 to perform the task 206 using the second mode of operation. Upon execution of the second instructions, the controller 136 of the machine 120-220 causes the machine 120-220 to execute the tasks defined by the second instructions. For example, the remote operator 212 may, using the operation mode UI 209, select the second mode of operation that may be used to eliminate the obstacle as described herein. At 424, the system controller 122 and/or the remote computing device 211 may receiving an indication that the obstacle has been eliminated. The same process described in connection with 213 of FIG. 2 may be used to validate that the worksite 112 is ready for the worksite plan 202 to be executed. The system controller 122 or other processing device may continue to monitor 426 for other obstacles that may be present within the worksite 112 by looping back to block 416.

INDUSTRIAL APPLICABILITY

The present disclosure describes systems and methods for controlling various machines, sensors, and/or other components of a system 100 employed at a worksite 112. Such systems and methods may be used to more effectively coordinate machines 102-220 during the execution of a worksite and ensure a safe environment in which different modes of operation of the machines 102-220 including manual operation, RC operation, and autonomous operation may be performed without risk to life and health of individuals or damage to property.

For example, such systems and methods may enable a remote operator 212 to assign a mode of operation, validate that the worksite 112 is ready for work to be performed thereon, and instruct machines 102-220 to perform tasks associated with the worksite plan in an effective manner and from a NLOS location. In some situations, the systems and methods may identify obstacles within the worksite during execution of the worksite plan, pause the operation of the machines 102-220 and the task being performed, and send notifications to a supervising entity 204 and/or the remote operator 212. Further, in some situations, PIs may be transmitted to the supervising entity 204 and/or the remote operator 212 in order to inform the supervising entity 204 and/or the remote operator 212 of completion of tasks within the worksite plan as well as progress by the machines 102-220 in completing the tasks 206.

As a result, the systems and methods of the present disclosure may assist in reducing the time and resources required to perform various tasks at the worksite 112, thereby improving the efficiency of the system 100. The systems and methods of the present disclosure may also reduce the risk of damage to property and risk to life and health of individuals that may be present at the worksite 112.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
receiving, with a controller, a worksite plan to be executed by at least one machine at a worksite from a computing device of a supervising entity, the controller being located at a non-line-of-sight (NLOS) location with respect to the worksite, the worksite plan identifying:
a boundary of the worksite, the boundary defining an area within which:
the worksite plan is to be implemented, and
the at least one machine is required to remain while executing the worksite plan;
at least one task including mission parameters defining the worksite plan;
a selection of the at least one machine to perform the task; and
at least one machine parameter;
receiving, with the controller, a validation signal from a device located at the worksite, the validation indicating that the worksite is ready for implementation of the worksite plan based on at least one parameter of worksite readiness;
selecting, with the controller and based at least in part on the worksite plan, a first mode of operation of the at least one machine to perform the task; and
transmitting first instructions to the at least one machine to perform the task based on the first mode of operation.

2. The method of claim 1, wherein:
the at least one machine operates under at least one of an autonomous operation mode in which the at least one machine is configured to perform at least one function unmanned, a remote-controlled (RC) operation mode in which the at least one machine is configured to operate via remote input from an NLOS computing device of an operator, and a manual operation mode in which the at least one machine is configured to operate via local input by a human, and
the method further comprises prioritizing one of the autonomous operation mode, the RC operation mode, and the manual operation mode based at least on a capability of the at least one machine.

3. The method of claim 1, wherein the computing device of the supervising entity is a NLOS computing device with respect to the controller and the worksite.

4. The method of claim 1, further comprising:
receiving, by the controller, at least one progress indicator (PI) from the worksite, the PI indicating a percentage of completion of the task; and
transmitting, with the controller, the PI from the at least one machine to the NLOS computing device.

5. The method of claim 1, further comprising:
receiving, by the controller, an indication that an obstacle related to an operation of the at least one machine has been detected;
determining, with the controller and based at least partly on the worksite plan, a second mode of operation of the at least one machine to complete the task; and
transmitting second instructions to the at least one machine to perform the task using the second mode of operation.

6. The method of claim 5, further comprising receiving, by the controller, a notification indicating a change from the first mode of operation to the second mode of operation.

7. The method of claim 5, further comprising transmitting, with the controller, the indication of the obstacle related to the operation of the at least one machine to the NLOS computing device.

8. The method of claim 5, further comprising receiving, by the controller, an indication that the obstacle related to the operation of the at least one machine has been eliminated.

9. The method of claim 5, wherein instructions defining the worksite plan, the first mode of operation, and the second mode of operation are transmitted via an Internet of things (IoT) network to at least one electronic control module (ECM) of the at least one machine to control a function of the at least one machine associated with the ECM.

10. The method of claim 1, wherein the controller communicates with a communication device of the at least one machine via a cellular network.

11. A controller located at a non-line-of-sight (NLOS) location with respect to a worksite system, the controller comprising:
one or more processors;
memory communicatively coupled to the one or more processors, the memory storing thereon instructions that, when executed by the one or more processors, cause the one or more processors to perform operations, the operations comprising:
receiving, from a computing device of a supervising entity, a worksite plan to be executed by at least one machine at a worksite, the worksite plan identifying:
a boundary of the worksite, the boundary defining an area within which:
the worksite plan is to be implemented, and
the at least one machine is required to remain while executing the worksite plan,
at least one task including mission parameters defining the worksite plan,
a selection of the at least one machine to perform the task, and
at least one machine parameter;
receiving, from a device located at the worksite, a validation signal the validation indicating that the worksite is ready for implementation of the worksite plan based on at least one parameter of worksite readiness;
selecting, based at least in part on the worksite plan, a first mode of operation of the at least one machine to perform the task; and
transmitting first instructions to the at least one machine to perform the task based on the first mode of operation.

12. The controller of claim 11, wherein the operations further comprise:
receiving at least one progress indicator (PI) from the worksite, the PI indicating a percentage of completion of the task; and
transmitting the PI from the at least one machine to the NLOS computing device.

13. The controller of claim 11, wherein the operations further comprise:
receiving an indication that an obstacle related to an operation of the at least one machine has been detected;
determining, based at least partly on the worksite plan, a second mode of operation of the at least one machine to complete the task; and
transmitting second instructions to the machine to perform the task using the second mode of operation.

14. The controller of claim 13, wherein the operations further comprise:
receiving a notification indicating a change from the first mode of operation to the second mode of operation.

15. The controller of claim 13, determining, based at least partly on the worksite plan, a second mode of operation of the at least one machine to complete the task includes:
determining that the at least one machine is unable to remove the obstacle in the first mode of operation; and
selecting the second mode of operation of the at least one machine to complete the task.

16. The controller of claim 13, wherein the operations further comprise:
receiving an indication that the obstacle related to the operation of the at least one machine has been eliminated.

17. Non-transitory memory, storing thereon instructions that, when executed by one or more processors, cause the one or more processors of a controller located at a non-line-of-sight (NLOS) location with respect to a worksite system to perform operations, the operations comprising:
receiving, from a computing device of a supervising entity, a worksite plan to be executed by at least one machine at a worksite, the worksite plan identifying:
a boundary of the worksite, the boundary defining an area within which:
the worksite plan is to be implemented, and
the at least one machine is required to remain while executing the worksite plan,
at least one task including mission parameters defining the worksite plan,
a selection of the at least one machine to perform the task, and
at least one machine parameter;
receiving, from a device located at the worksite, a validation signal the validation indicating that the worksite is ready for implementation of the worksite plan based on at least one parameter of worksite readiness;
selecting, based at least in part on the worksite plan, a first mode of operation of the at least one machine to perform the task; and
transmitting first instructions to the at least one machine to perform the task based on the first mode of operation.

18. The non-transitory memory of claim 17, wherein the operations further comprise:
receiving at least one progress indicator (PI) from the worksite, the PI indicating a percentage of completion of the task; and
transmitting the PI from the at least one machine to the NLOS computing device.

19. The non-transitory memory of claim 17, wherein the operations further comprise:
receiving an indication that an obstacle related to an operation of the at least one machine has been detected;
determining, based at least partly on the worksite plan, a second mode of operation of the at least one machine to complete the task;
transmitting second instructions to the at least one machine to perform the task using the second mode of operation; and
receiving a notification indicating a change from the first mode of operation to the second mode of operation.

20. The non-transitory memory of claim 17, wherein the operations further comprise:
prioritizing one of an autonomous operation mode, a remote control (RC) operation mode, and a manual operation mode based at least on a capability of the at least one machine.

* * * * *